United States Patent
Baratelli

(10) Patent No.: US 6,325,285 B1
(45) Date of Patent: Dec. 4, 2001

(54) SMART CARD WITH INTEGRATED FINGERPRINT READER

(75) Inventor: Paul J. Baratelli, Wall, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/439,648

(22) Filed: Nov. 12, 1999

(51) Int. Cl.⁷ .................................................. G06K 5/00
(52) U.S. Cl. .......................... 235/380; 235/382; 902/3; 902/5
(58) Field of Search .................... 235/380, 382, 235/487, 492; 902/3, 4, 5

(56) References Cited

U.S. PATENT DOCUMENTS

| | | | | |
|---|---|---|---|---|
| 4,582,985 | * | 4/1986 | Lofberg | 235/380 |
| 4,783,823 | * | 11/1988 | Tasaki et al. | 382/4 |
| 4,851,654 | * | 7/1989 | Nitta | 235/492 |
| 4,975,969 | * | 12/1990 | Tal | 382/2 |
| 5,325,442 | | 6/1994 | Knapp | 382/4 |
| 5,363,453 | | 11/1994 | Gagne et al. | 382/5 |
| 5,426,708 | | 6/1995 | Hamada et al. | 382/125 |
| 5,467,403 | | 11/1995 | Fishbine et al. | 382/116 |
| 5,513,272 | * | 4/1996 | Bogosian et al. | 382/116 |
| 5,566,327 | | 10/1996 | Sehr | 395/600 |
| 5,623,552 | * | 4/1997 | Lane | 382/124 |
| 5,648,648 | * | 7/1997 | Chou et al. | 235/382 |
| 5,712,473 | * | 1/1998 | Nagashio | 235/494 |
| 5,801,367 | * | 9/1998 | Asplund et al. | 235/384 |
| 5,960,100 | * | 9/1999 | Hargrove | 382/124 |
| 6,012,636 | * | 1/2000 | Smith | 235/380 |
| 6,018,739 | * | 1/2000 | McCoy et al. | 707/102 |
| 6,092,192 | * | 7/2000 | Kanevsky et al. | 713/186 |
| 6,097,035 | * | 8/2000 | Belongie et al. | 250/556 |

OTHER PUBLICATIONS

Jose Luis Zoreda et al., *Smart Cards*, Arttech House, Inc., 1994, pp. 165–173.

* cited by examiner

*Primary Examiner*—Karl D. Frech
*Assistant Examiner*—Daniel St. Cyr
(74) *Attorney, Agent, or Firm*—Pennie & Edmonds LLP

(57) ABSTRACT

The improved smart card of the present invention preferably comprises a CPU, memory, and a fingerprint reader including a sensing surface. Preferably, the sensing surface is located along a surface of the smart card so that a user's thumb is naturally positioned over the sensing surface when the card is inserted into a write/read unit or other suitable card reader. When an individual inserts the smart card into a write/read unit, the smart card creates an electrical representation of the individual's fingerprint and compares the acquired representation to a stored fingerprint representation in the card's memory. If the acquired representation matches the stored representation, the card is enabled, and the user is given access to information and/or services that require cooperation of the smart card.

14 Claims, 20 Drawing Sheets

SMART CARD WITH INTEGRATED FINGERPRINT READER

BACKGROUND OF THE INVENTION

A smart card is a card made from plastic or other suitable material that comprises some degree of processing capability. Typically, smart cards may be programmed to perform a wide variety of functions. For example, a single smart card may be programmed to open doors as a key, store medical information, and serve as an electronic credit card. A single smart card therefore has the potential to replace many of the items that people carry and use in their day-to-day lives.

Although widespread adoption of smart card technology promises great benefits, many individuals remain hesitant about using smart cards because of security concerns. For example, if the smart card just described is lost, the card's finder might use the card to gain access to the card owner's home or to improperly charge purchases against the card owner's credit account.

It has therefore been suggested to combine the use of smart cards with a biometric test in order to confirm that the person using the card is, in fact, an authorized user such as the card owner. Specifically, it has been suggested to provide fingerprint-reading-and-comparison apparatus to compare the fingerprint of an individual presenting a smart card to a stored fingerprint on the smart card, in order to ensure that the person presenting the card is authorized to do so. Such a biometric system was used, for example, at EXPO'92 in Spain, as described in "Smart Cards" by Jose Luis Zoreda et al. (Artech House, Inc., 1994), which is hereby incorporated by reference.

As Zoreda et al. note, however, this prior art technique may be subject to consumer rejection especially in countries where fingerprint information is typically collected only from criminals. More specifically, individuals may be hesitant to employ a biometric system that collects and stores their fingerprint information.

SUMMARY OF THE INVENTION

It is therefore an object of the present invention to provide a system and method that confirms the identity of an individual presenting a smart card using a biometric, but does not require any of the individual's biometric information to be collected or stored by a reader or other device that is outside of the individual's control.

A preferred embodiment of the present invention comprises an improved smart card made of plastic or other suitable material. The smart card preferably comprises a CPU, memory, and a fingerprint reader including a sensing surface. Preferably, the sensing surface is located along a surface of the smart card so that a user's thumb is naturally positioned over the sensing surface when the card is inserted into a write/read unit or other suitable card reader.

When an individual inserts the smart card into a write/read unit, the smart card creates an electrical representation of the individual's fingerprint and compares the acquired representation to a stored fingerprint representation in the card's memory. If the acquired representation matches the stored representation, the card is enabled, and the user is given access to information and/or services that require cooperation of the smart card.

BRIEF DESCRIPTION OF THE DRAWINGS

The above summary of the invention will be better understood when taken in conjunction with the following detailed description and accompanying drawings, in which.

DETAILED DESCRIPTION OF THE PREFERRED EMBODIMENTS

Figure 1A:
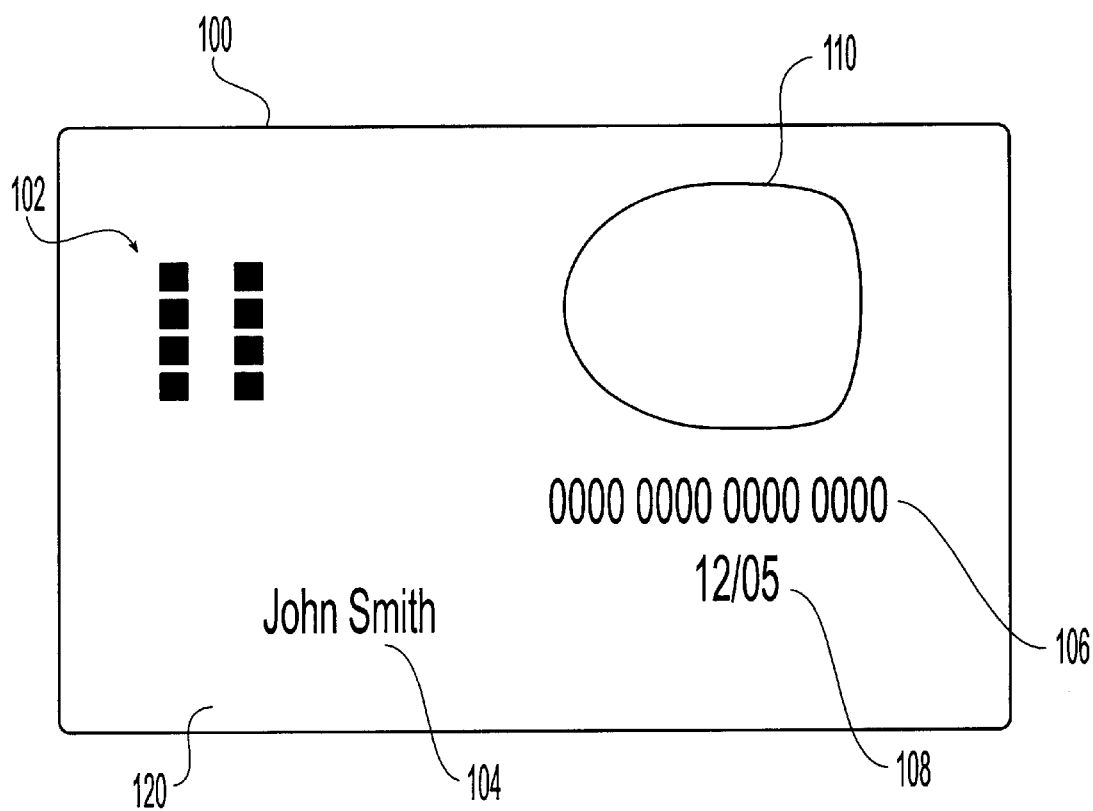
FIG. 1A is a first preferred embodiment of an improved smart card of the present invention in which contacts C1–C8 are located on the front of the smart card.

FIG. 1A shows a preferred embodiment of an improved smart card 100 of the present invention. As shown in FIG. 1A, smart card 100 preferably comprises a plurality of contacts 102. The number and arrangement of contacts 102 preferably satisfies international smart card standard ISO 7816 promulgated by the International Standards Organization. That standard requires the centers of contacts 102 to be located as specified in the table below:

| Contact | Distance From Left Edge Of Card | Distance From Upper Edge Of Card |
| --- | --- | --- |
| C1 | 11.25 mm | 20.08 mm |
| C2 | 11.25 mm | 22.62 mm |
| C3 | 11.25 mm | 25.16 mm |

-continued

| Contact | Distance From Left Edge Of Card | Distance From Upper Edge Of Card |
|---|---|---|
| C4 | 11.25 mm | 27.70 mm |
| C5 | 18.87 mm | 20.08 mm |
| C6 | 18.87 mm | 22.62 mm |
| C7 | 18.87 mm | 25.16 mm |
| C8 | 18.87 mm | 27.70 mm |

As known in the art, when smart card 100 is inserted into a write/read unit (WRU) or other suitable device, contacts 102 are engaged by leads within the WRU to enable communication between the WRU and smart card 100. ISO 7816 reserves a specific function for each of contacts 102. In accordance with the standard, contact C1 serves as a power supply input via which a WRU supplies power to smart card 100. The specified supply voltage is 5 volts ∀ 0.25 volts.

Contact C2 is used to transmit reset signals from a WRU to smart card 100. A reset signal is typically transmitted to smart card 100 at the beginning of each transaction, i.e., when the smart card is inserted into the WRU.

Contact C3 serves as a clock input to transmit timing signals from a WRU to smart card 100. As known in the art, external clock signals are not necessary when the card has its own internal clock.

No function for contact C4 has yet been defined. It has been reserved for assignment in revisions to ISO 7816.

Contact C5 serves as a reference voltage or ground. All other voltages in smart card 100 are referenced to this voltage.

Contact C6 is used by the WRU to program or erase internal non-volatile memory located on smart card 100. ISO 7816/3 specifies permissible voltage signals that may be used by a WRU to program or erase nonvolatile smart card memory.

Contact C7 is used to transmit communications to and from the card and is therefore referred to as the I/O contact. ISO standards specify a particular protocol for communication with smart card 100 via contact C7.

No function for contact C8 has yet been defined. It has been reserved for assignment in revisions to ISO 7816.

As further shown in FIG. 1A, smart card 100 may also comprise various identifying indicia such as a user name 104 and a card number 106 that identify the card owner. Alternatively, it may be preferable for security reasons not to print the cardholder's name on smart card 100.

An expiration date 108 may also be printed or embossed on smart card 100. In addition, further information, such as information identifying the card issuer, may be printed or embossed on smart card 100.

Smart card 100 further comprises a sensing surface 110. As described in more detail below, sensing surface 110 constitutes part of a fingerprint reader that is adapted to generate electrical signals representative of the fingerprint of a finger placed on sensing surface 110. As described in more detail below, sensing surface 110 is preferably situated along a surface of the housing 120 of smart card 100 such that a user's thumb will naturally cover sensing surface 110 when the user holds the card in his or her hand as he or she inserts smart card 100 into a WRU.

Figure 1B:
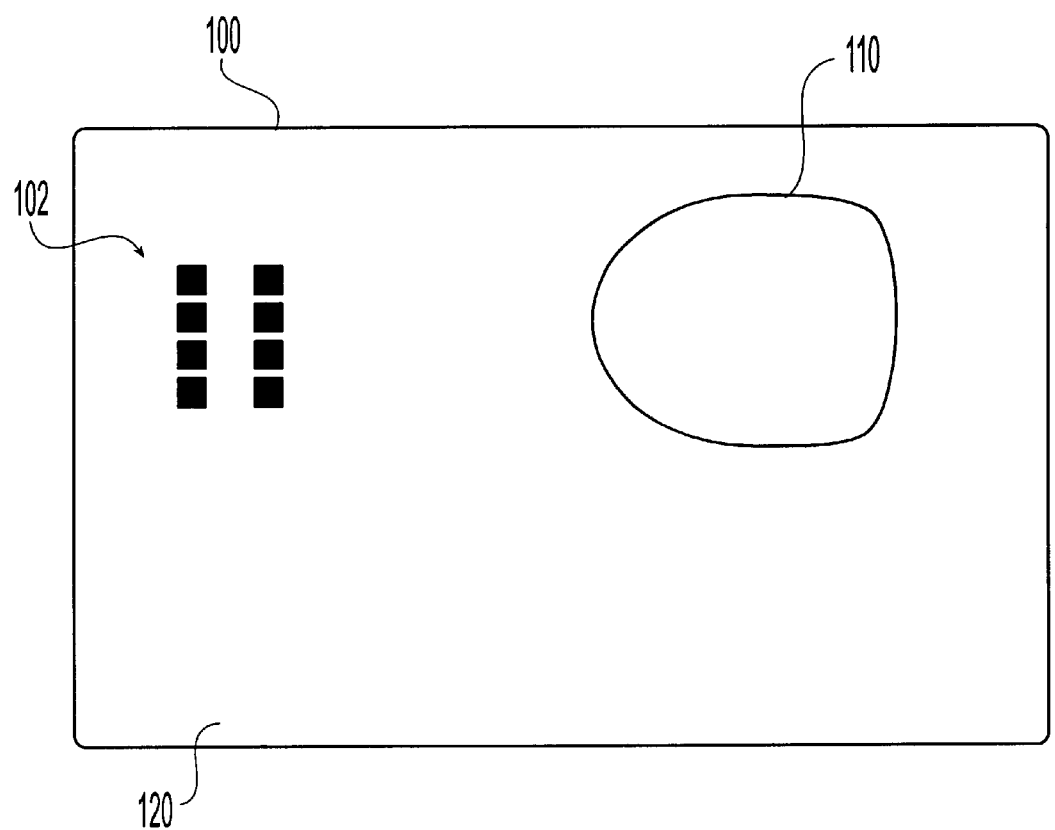
FIG. 1B is a second preferred embodiment of an improved smart card of the present invention in which contacts C1–C8 are located on the back of the smart card.

In an alternative preferred embodiment, contacts C1–C8 may instead be located on the back of smart card 100, as shown in FIG. 1B. In this alternative embodiment, sensing surface 110 is preferably located on the back of smart card 100 as well, i.e., on the same side of the smart card as contacts 102. This again allows the thumb of a user to naturally be positioned on sensing surface 110 as the user inserts smart card 100 into a WRU.

Figure 1C:
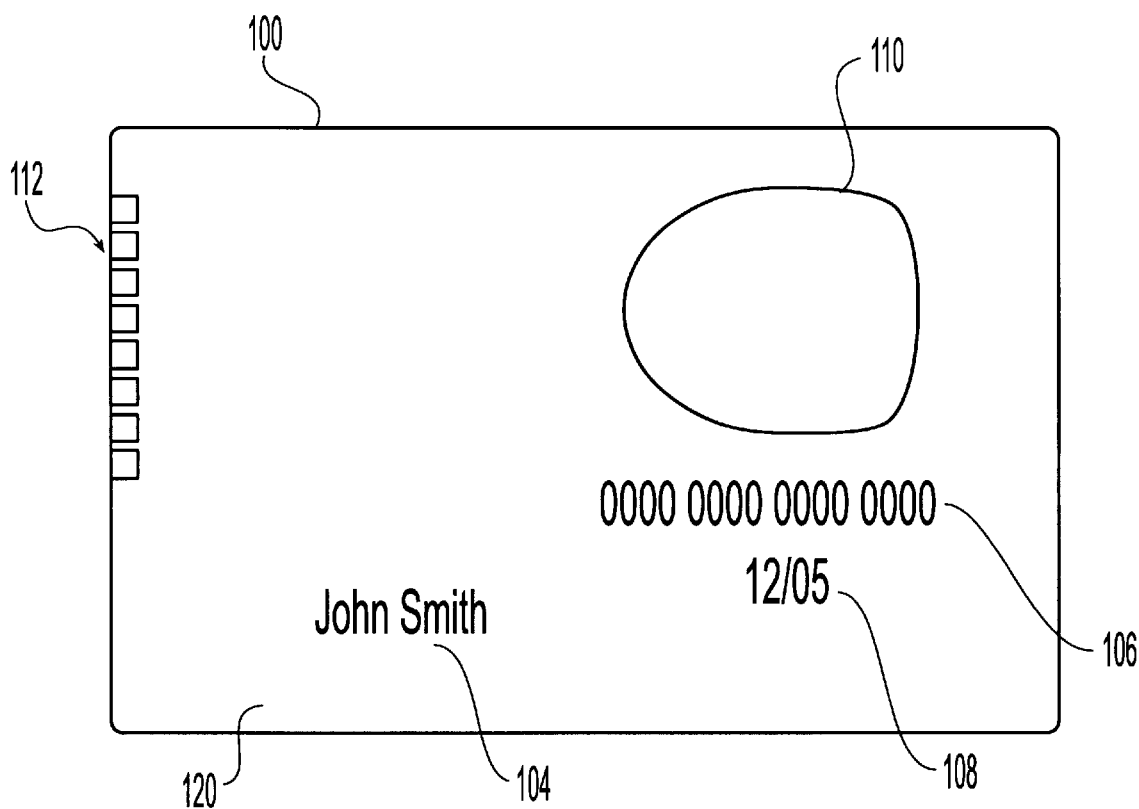
FIG. 1C is a third preferred embodiment of an improved smart card of the present invention in which the smart card comprises a plurality of end connectors.

In a further alternative preferred embodiment, smart card 100 may establish contact with the WRU via a plurality of end connectors 112, as shown in FIG. 1C. Electrical connection between the WRU and electrical contacts 102, 112 may be established by physical contact, inductive contact, or other suitable connection.

Figure 2:
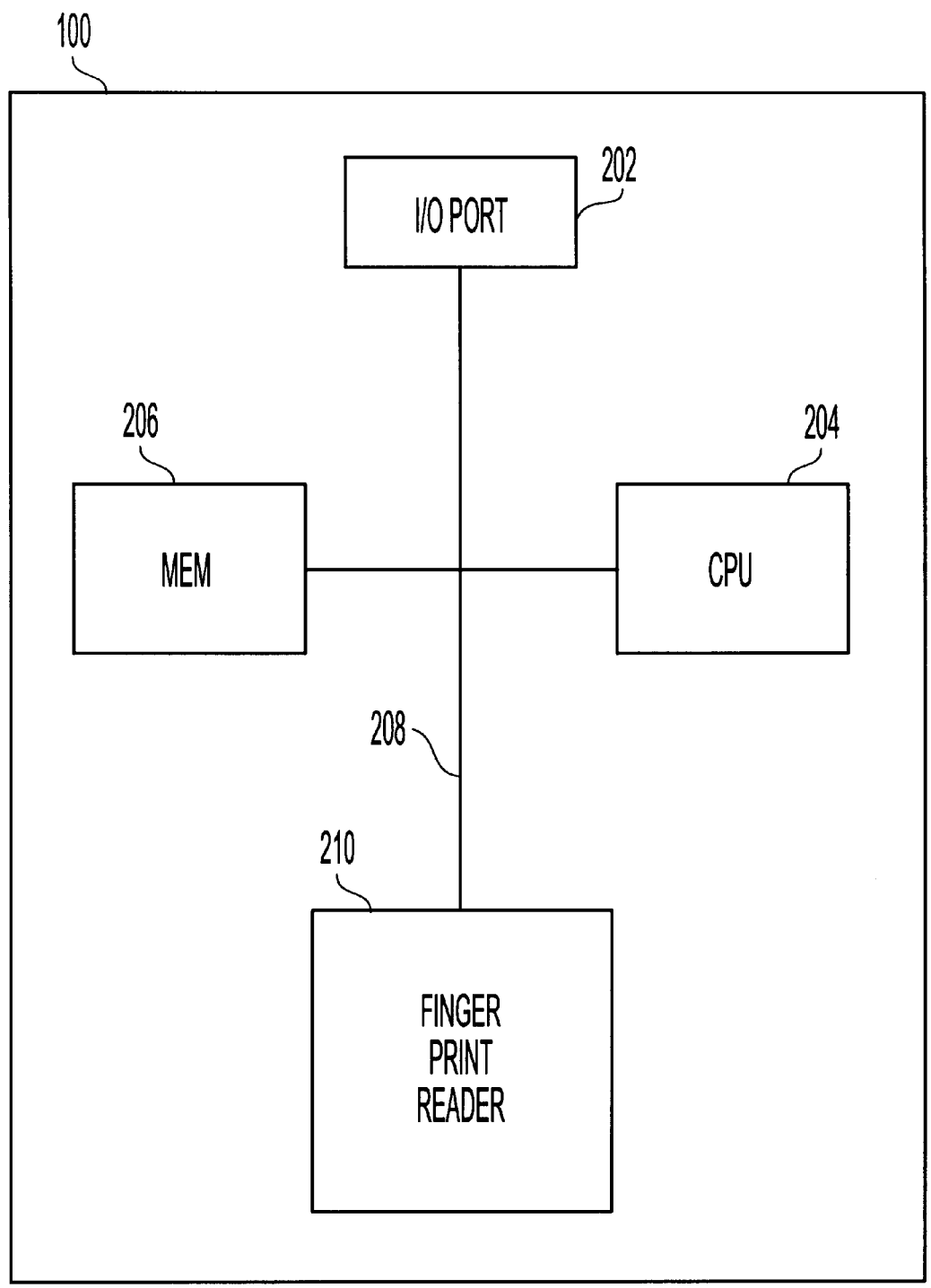
FIG. 2 is a schematic representation of the electronic components of the improved smart card of the present invention.

FIG. 2 is a schematic representation of the electronic components of the improved smart card of the present invention. As shown in FIG. 2, smart card 100 preferably comprises an I/O port 202 for receiving communications from, and transmitting communications to, a WRU. Smart card 100 further comprises a CPU 204 and memory 206. In a preferred embodiment, memory 206 may comprise both volatile memory, such as RAM, as well as nonvolatile memory, such as ROM, and a programmable EEPROM. Components 202–206 are connected to each other via a bus 208. Also connected to bus 208 is a fingerprint reader 210 adapted to generate electrical signals representative of the fingerprint of a finger placed on sensing surface 110.

Figure 3A:
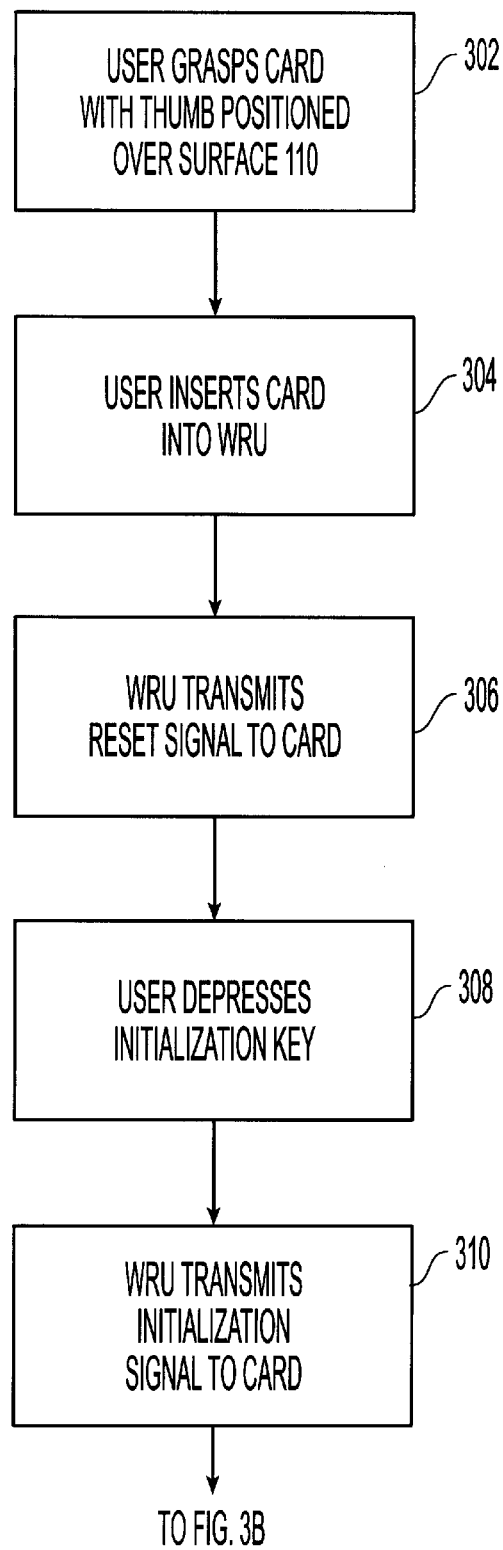
FIG. 3 is a flowchart depicting a preferred initialization process for the improved smart card of the present invention.
Figure 3B:
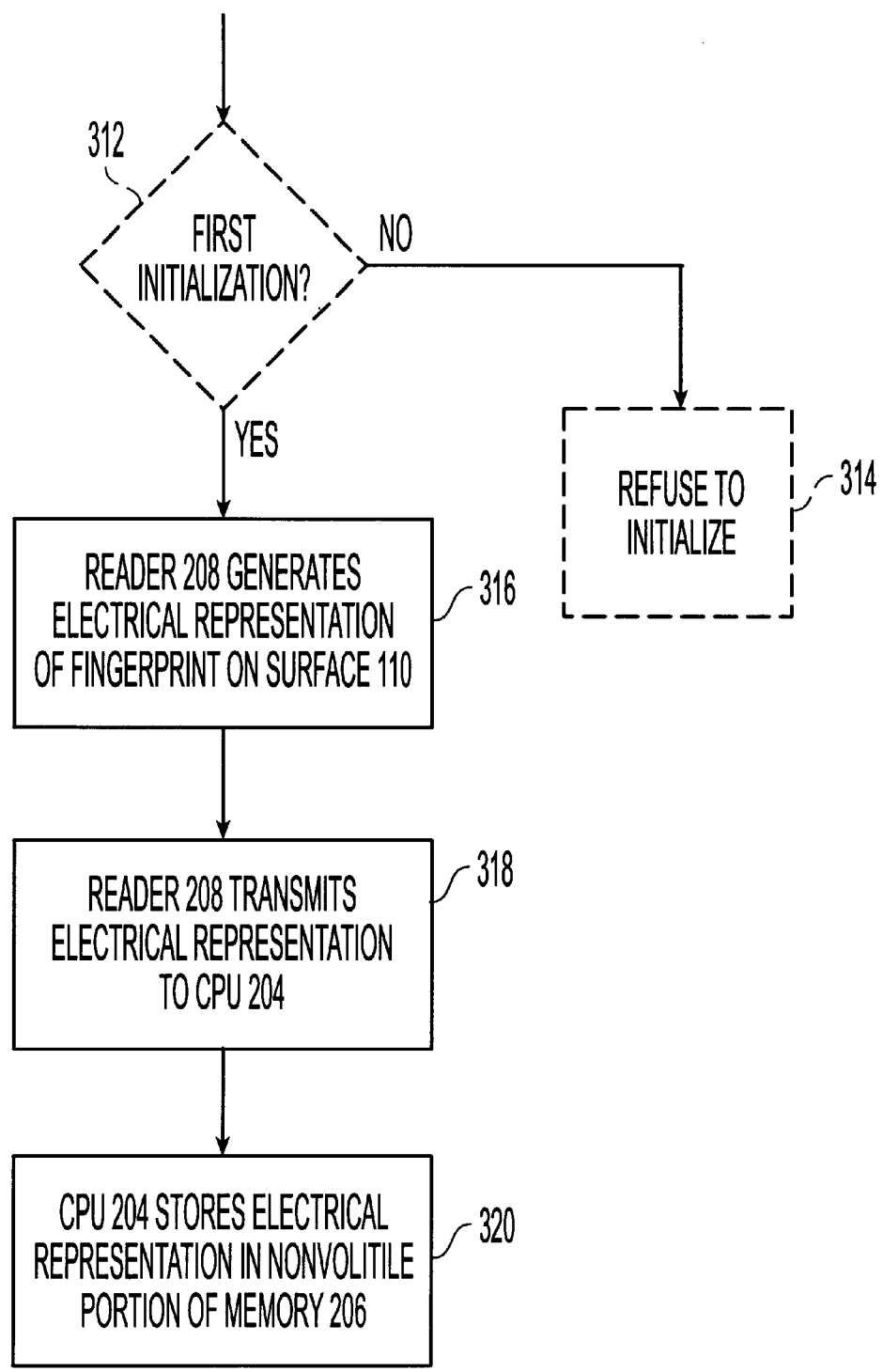
Figure 4A:
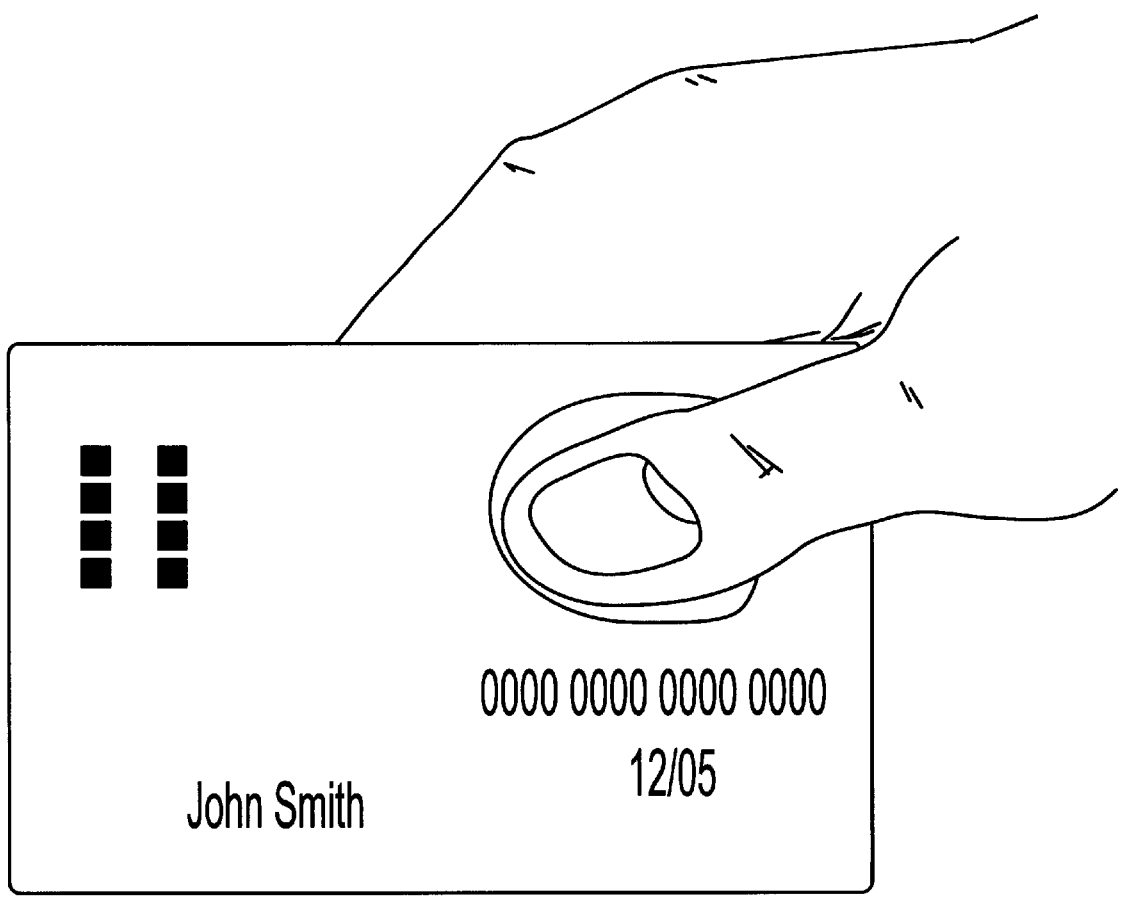
FIG. 4A shows a user grasping the improved smart card of the present invention before the smart card is inserted into a write/read unit.
Figure 4B:
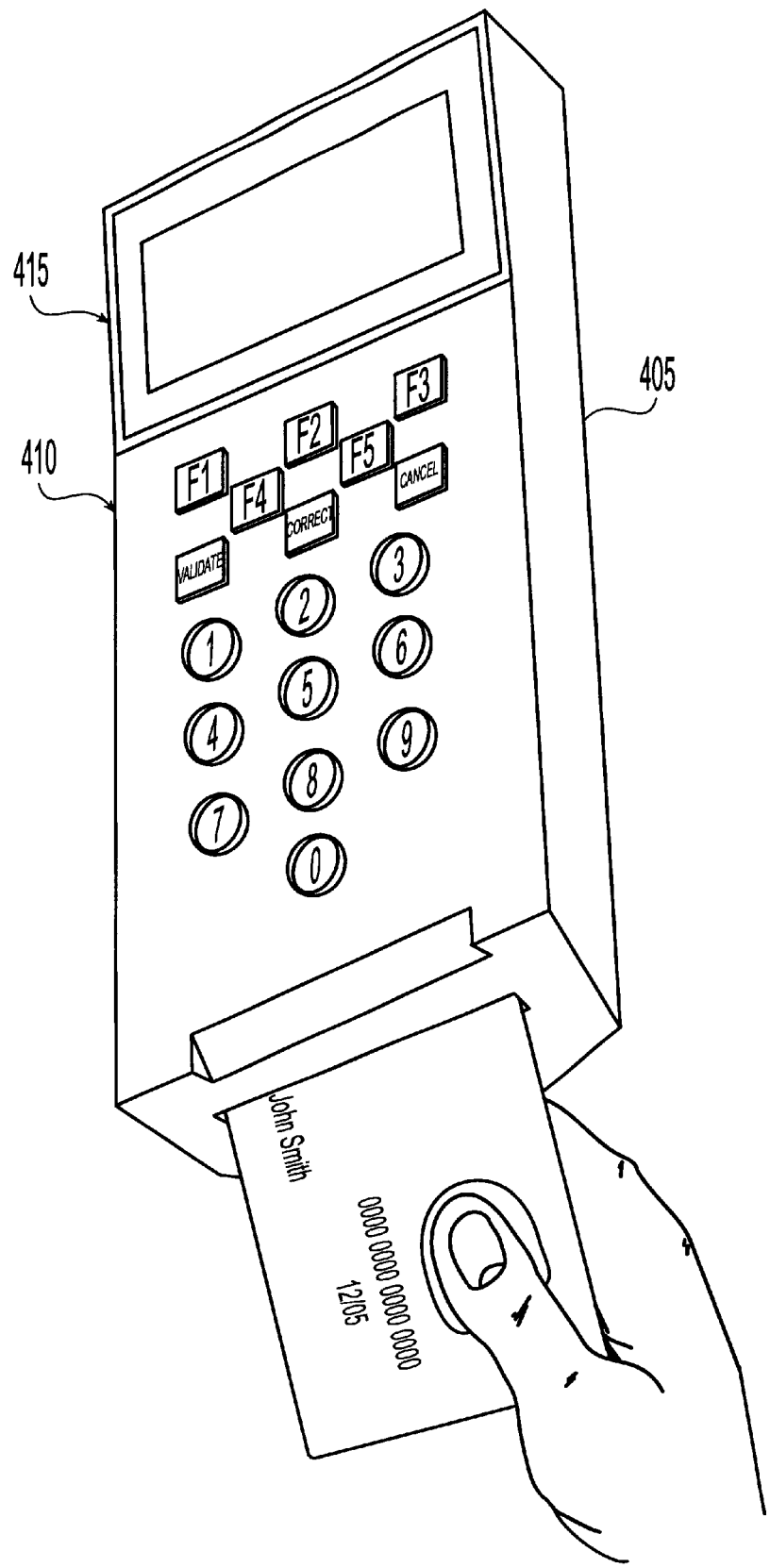
FIG. 4B shows a user grasping the improved smart card of the present invention after the smart card is inserted into a write/read unit.

A preferred initialization process for irrefutably binding smart card 100 to the authorized user is now described in connection with FIG. 3A–B. In step 302, the user grasps smart card 100 between the user's thumb and forefinger such that the user's thumb is positioned over sensing surface 110, as shown in FIG. 4A. In step 304, the user inserts smart card 100 into WRU 405, as shown in FIG. 4B. In step 306, WRU 405 senses the presence of smart card 100 and transmits a reset signal to smart card 100 via contact C2 to initialize a communications session.

In step 308, the user indicates to WRU 405 that he or she wishes to initialize smart card 100. This indication may, for example, be made by depressing a key on keypad 410 of WRU 405. WRU 405 then transmits a signal to smart card 100 via contact C7 to trigger an initialization sequence in smart card 100 (step 310). Alternatively, smart card 100 may be programmed to recognize the first time that it is inserted into a WRU 405 and to transmit a signal via contact C7 to WRU 405 to trigger the initialization process.

In a preferred embodiment, smart card 100 may be programmed to permit itself to be initialized only once. In this preferred embodiment, if an authorized user or other individual attempts to initialize smart card 100 a second time, smart card 100 will not perform such initialization. This preferred embodiment is illustrated in steps 312, 314 of FIG. 3B. In particular, in step 312, CPU 204 determines whether smart card 100 has previously been initialized. If smart card 100 has been initialized previously, then decision step 312 fails and smart card 100 will refuse to be initialized, as illustrated in step 314. In that event, CPU 204 may transmit a message to WRU 405 via contact C7 informing WRU 405 that smart card 100 may not be initialized and terminating the communications session. WRU 405 may display the same or similar message to the user on a display 415 (as on FIG. 4B).

Otherwise, the system proceeds to step 316 wherein fingerprint reader 210 generates an electrical representation of the fingerprint of the user's thumb located on surface 110. In step 318, fingerprint reader 210 transmits this electrical representation to CPU 204 via bus 208. CPU 204 stores this electrical representation in a nonvolatile portion of memory 206, as shown in step 320. Smart card 100 is thus irrefutably bound to the particular user who initialized it by storing a representation of a unique biometric of that user in memory 206.

As noted above, in a preferred embodiment it may be desirable to ensure that smart card 100 may be initialized only once. In that preferred embodiment, it may be further desirable, after the system performs step 320, to electrically disable the portion of memory 206 that stores the user's fingerprint representation so that it may not be written to again. This provides further security against a second card-initialization by an unauthorized individual who, for example, finds the card after it is lost by the authorized user.

Figure 5A:
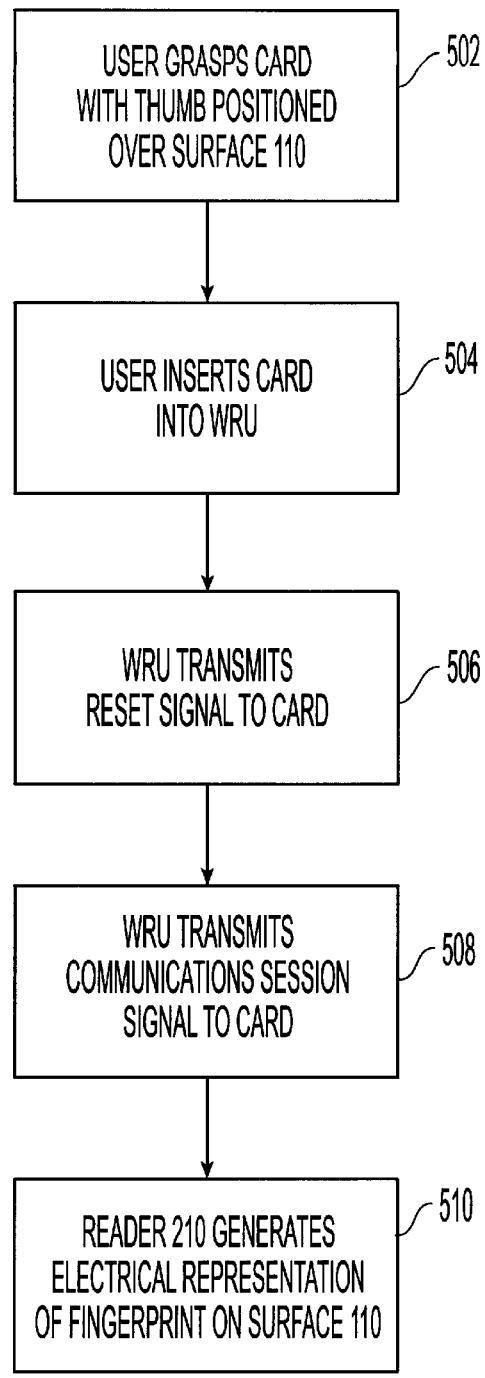
FIG. 5 is a flowchart depicting a preferred embodiment for using the improved smart card of the present invention.
Figure 5B:
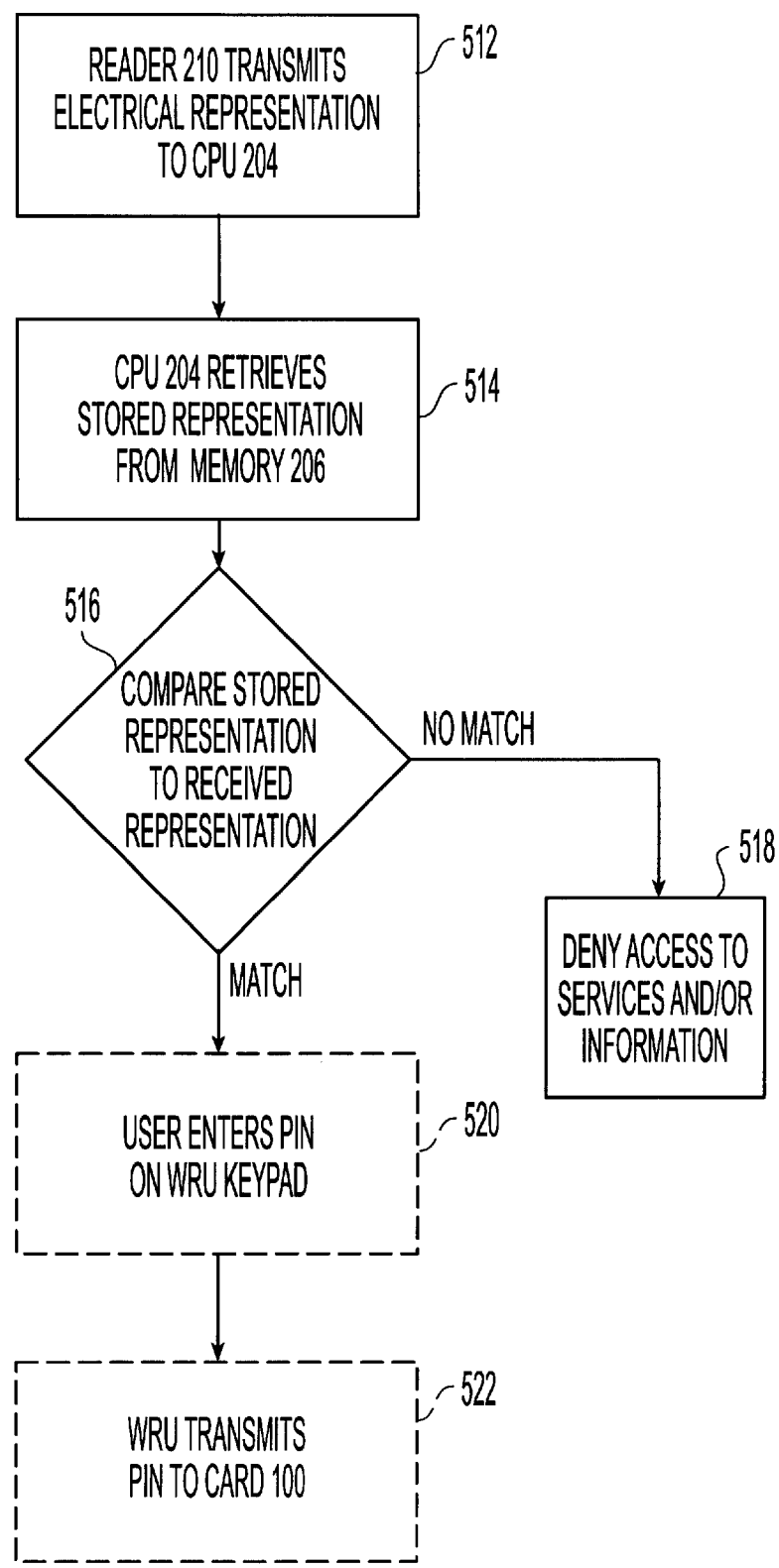
Figure 5C:
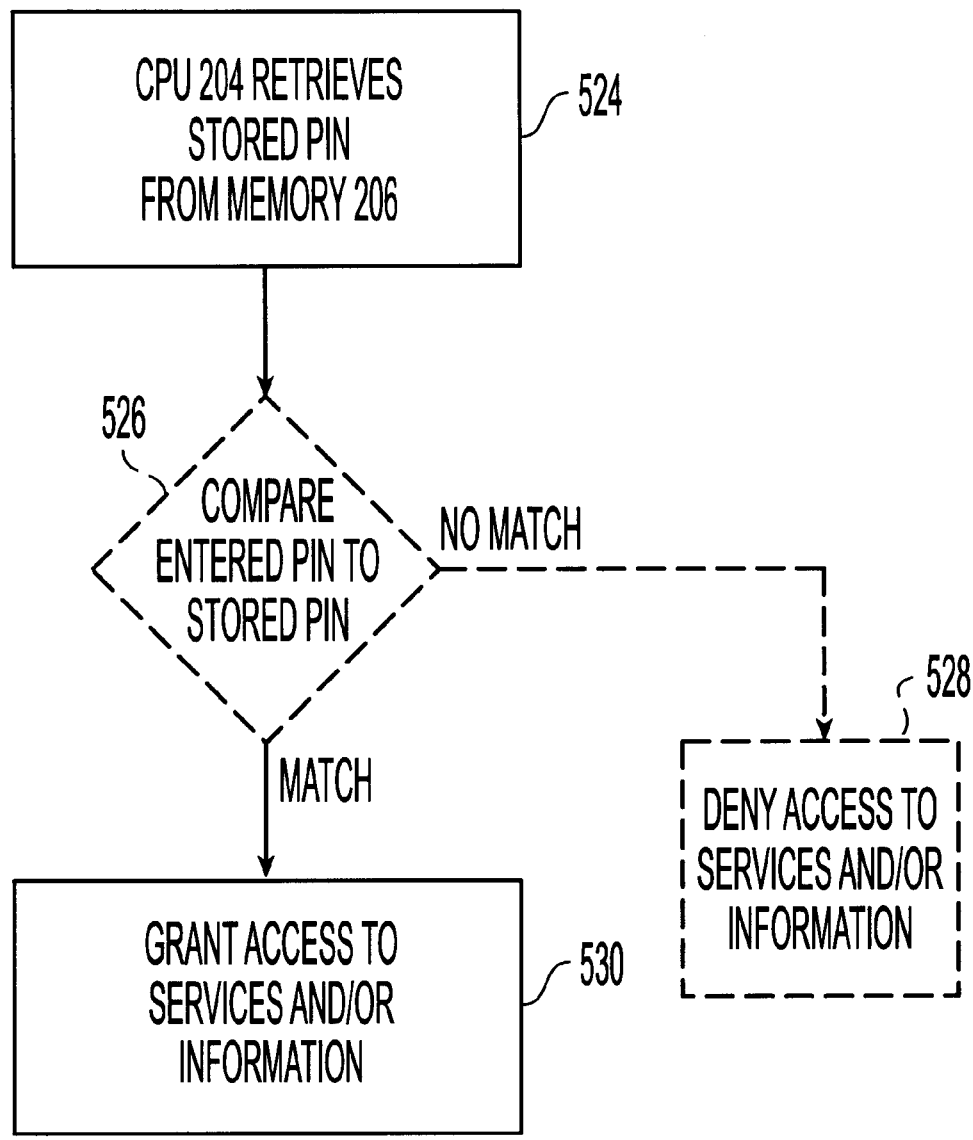

A preferred embodiment for using the improved smart card of the present invention is now described in connection with FIG. 5. As shown in FIG. 5A, in step 502, the user grasps smart card 100 between the user's thumb and forefinger such that the user's thumb is positioned over sensing surface 110 (FIG. 4A). In step 504, the user inserts smart card 100 into WRU 405 (FIG. 4B). In step 506, WRU 405 transmits a reset signal to smart card 100 via contact C2 to initialize a communications session with smart card 100. In step 508, WRU 405 transmits a signal to smart card 100 via contact C7 indicating the nature of the communications session to be established.

In step 510, fingerprint reader 210 generates an electrical representation of the fingerprint of the user's thumb located on sensing surface 110. In step 512, fingerprint reader 210 transmits this electrical representation to CPU 204. In step 514, CPU 204 retrieves from memory 206 the stored representation of the user's fingerprint created during initialization.

In step 516, CPU 204 compares the retrieved fingerprint representation to the acquired fingerprint representation. If decision step 516 fails, i.e., the retrieved fingerprint representation does not match the acquired fingerprint representation, the system proceeds to step 518 where CPU 204 denies access to services and/or information available from, or with the cooperation of, smart card 100. CPU 204 may transmit a message to WRU 405 via contact C7 informing WRU 405 that the fingerprint match has failed and terminating the communications session. WRU 405 may display the same or similar message to the user.

If, on the other hand, decision step 516 succeeds, i.e., the retrieved representation matches the acquired representation, then the system proceeds to step 520 as described below.

Steps 520–532 illustrate a preferred embodiment in which access to smart card 100 further requires the user to enter a preprogrammed personal identification number (PIN) stored in memory 206 of smart card 100. In particular as shown in step 520, in this preferred embodiment once a match between the user's fingerprint and the stored fingerprint representation is established, the user enters his or her PIN typically via keypad 410 of WRU 405. The PIN may be chosen by the card manufacturer at the time of manufacture or alternatively may be chosen by the user or other individual (e.g., a bank officer) at the time the card is initialized or at a different time.

In step 522, WRU 405 transmits the PIN to smart card 100 via contact C7. In step 524, CPU 204 retrieves the stored PIN from memory 206. In step 526, CPU 204 compares the acquired PIN to the retrieved PIN.

If decision step 526 fails, i.e., the entered PIN does not match the stored PIN, then the system proceeds to step 528 wherein CPU 204 denies access to services and/or information available from, or with the cooperation of, smart card 100. CPU 204 may transmit a message to WRU 405 via contact C7 informing WRU 405 that the PIN match has failed and requesting that the user re-enter his or her PIN. As known in the art, the user may be permitted to attempt to re-enter his or her PIN several times (e.g., three times) before being permanently denied access to smart card 100. In that event, smart card 100 may transmit a message to WRU 405 via contact C7 indicating that the PIN match has failed three times and terminating the communications session. WRU 405 may then display an appropriate message to the user on display 415.

Otherwise, if decision step 526 succeeds, i.e., the entered PIN matches the stored PIN, the system proceeds to step 530, wherein smart card 100 grants access to services and/or information available from, or with the cooperation of, smart card 100.

In an alternative embodiment, smart card 100 may transmit a copy of the user's PIN from memory 206 to WRU 405, and WRU 405 may perform the PIN comparison between the stored PIN and the PIN entered by the user.

As will be recognized by those skilled in the art, the improved smart card of the present invention may be used in a wide variety of applications. Two such applications will now be described in connection with FIGS. 6 and 7.

Figure 6:
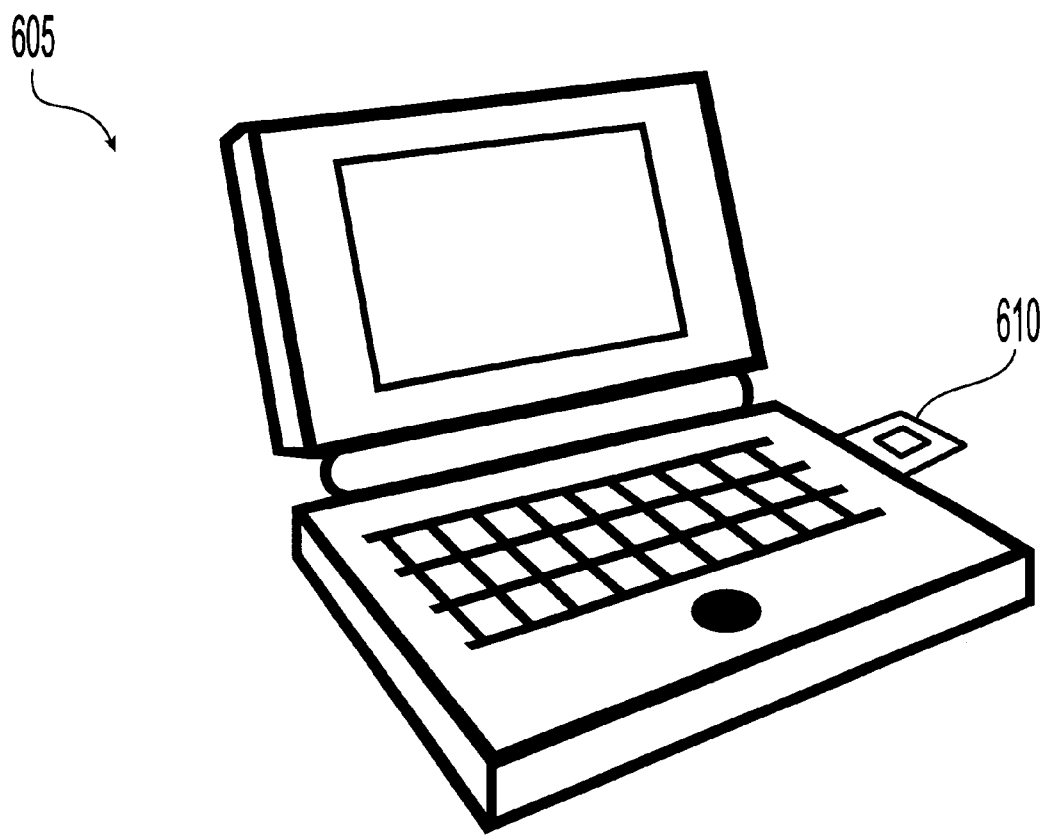
FIG. 6 illustrates a preferred embodiment of the present invention in which the improved smart card of the present invention is used to control access to sensitive data and/or computer software.

The first application is described in connection with FIG. 6. Shown in FIG. 6 is a laptop 605 comprising a WRU 610. Laptop 605 may preferably be connected via wired or wireless modem, LAN, or other connection to one or more computers or other electronic devices.

In this preferred application, when a user wishes to access secure programs, data, or other resources from laptop 605 or another remote device, the user inserts smart card 100 into WRU 610 of laptop 605, as described in detail above in connection with steps 502–04. Smart card 100 then determines whether the user's fingerprint matches the stored fingerprint in memory 206, as described in detail above in connection with steps 506–518. In addition, to prove authorization, the user may be required to enter his or her PIN, as described in detail above in connection with steps 524 to 528. Only after the user's identity is confirmed will laptop 605 or a remote device connected to laptop 605 permit the user to access secure programs and data.

Remote devices may employ various protocols to ensure that access is permitted to secure resources only when an enabled smart card 100 is inserted in WRU 610. In one such protocol, when a user requests access to a secure resource, the remote device at which the resource is located first transmits a challenge to smart card 100 via laptop 605. If smart card 100 has been enabled (i.e., if the user's fingerprint matches the stored fingerprint of an authorized user) then smart card 100 signs the challenge with its secret key, and returns it to the remote device via laptop 605. Once it receives a properly signed challenge, the remote device permits the user to access the requested resource via laptop 605.

Figure 7:
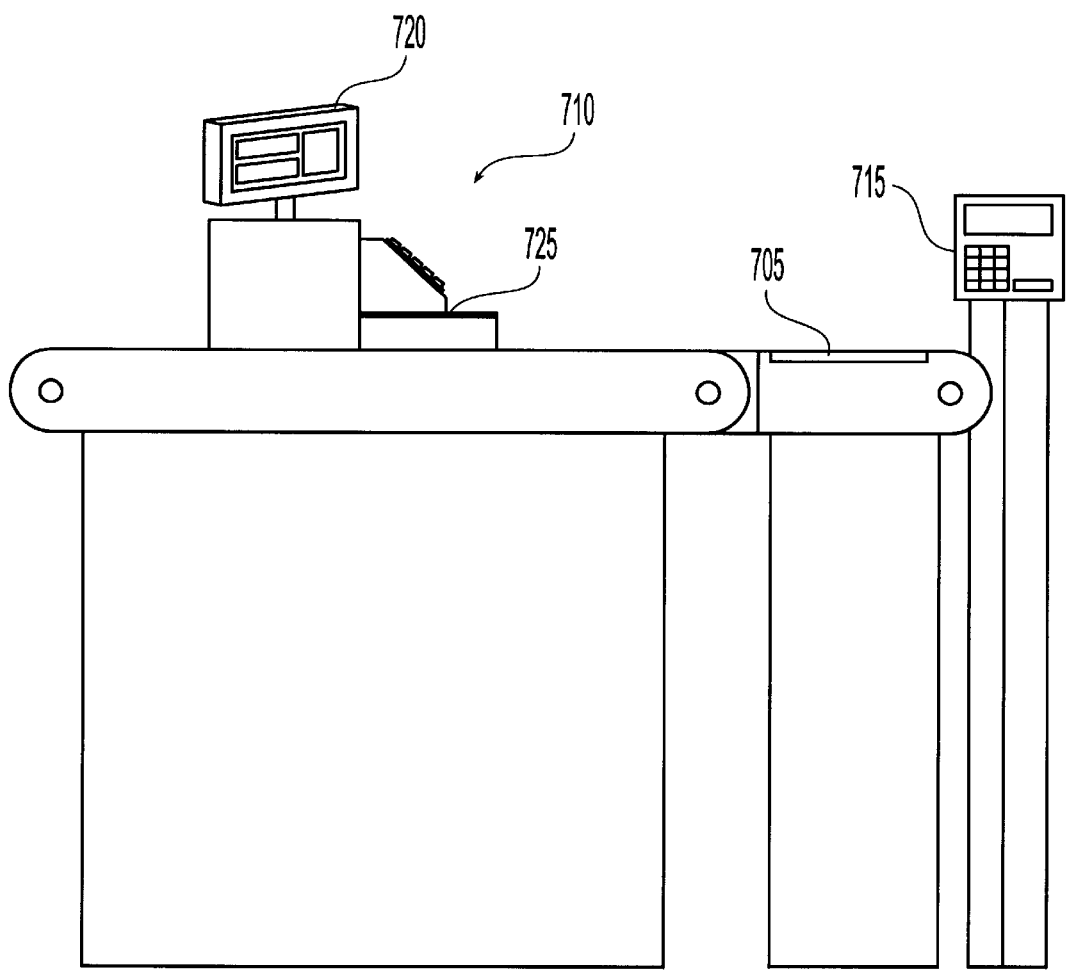
FIG. 7 illustrates a preferred embodiment of the present invention in which the improved smart card of the present invention is used to confirm the identity of a purchaser at a point-of-sale.
Figure 8A:
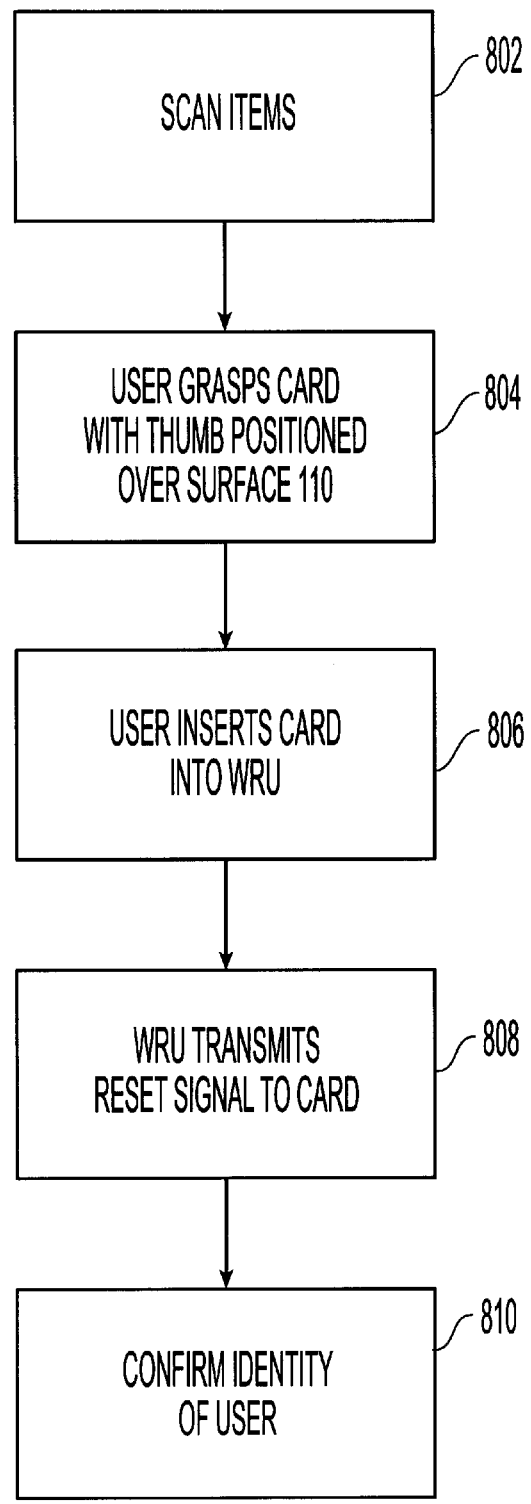
FIG. 8 is a flowchart depicting the steps of the preferred embodiment of FIG. 7.
Figure 8B:
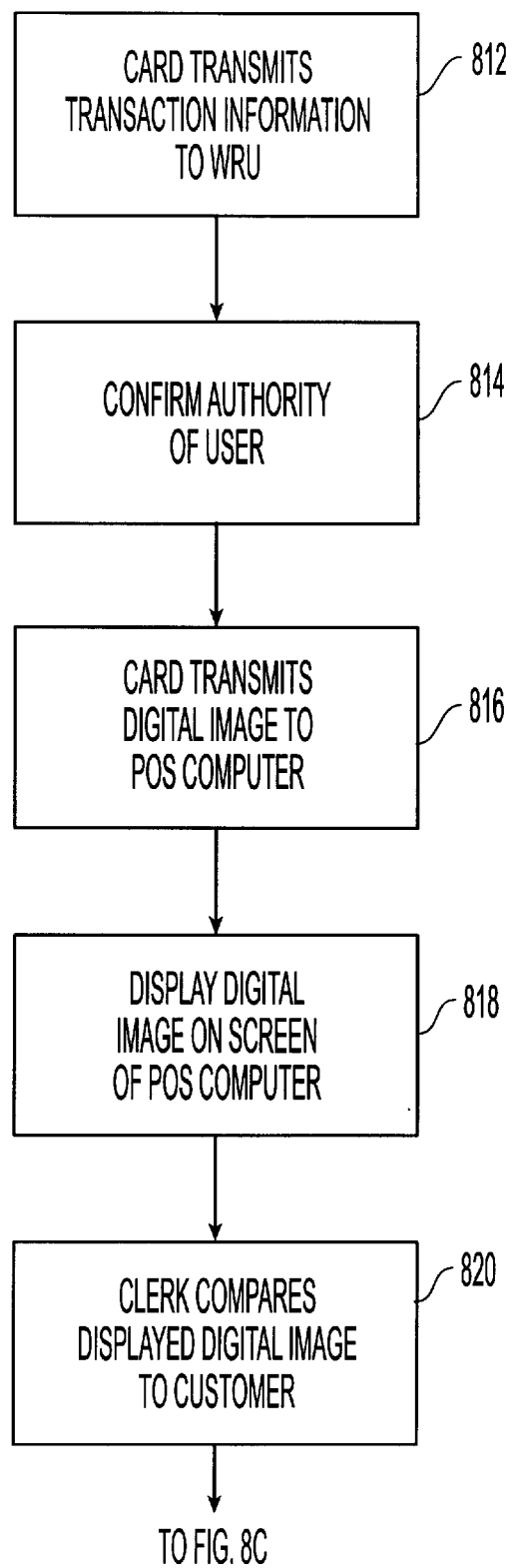
Figure 8C:
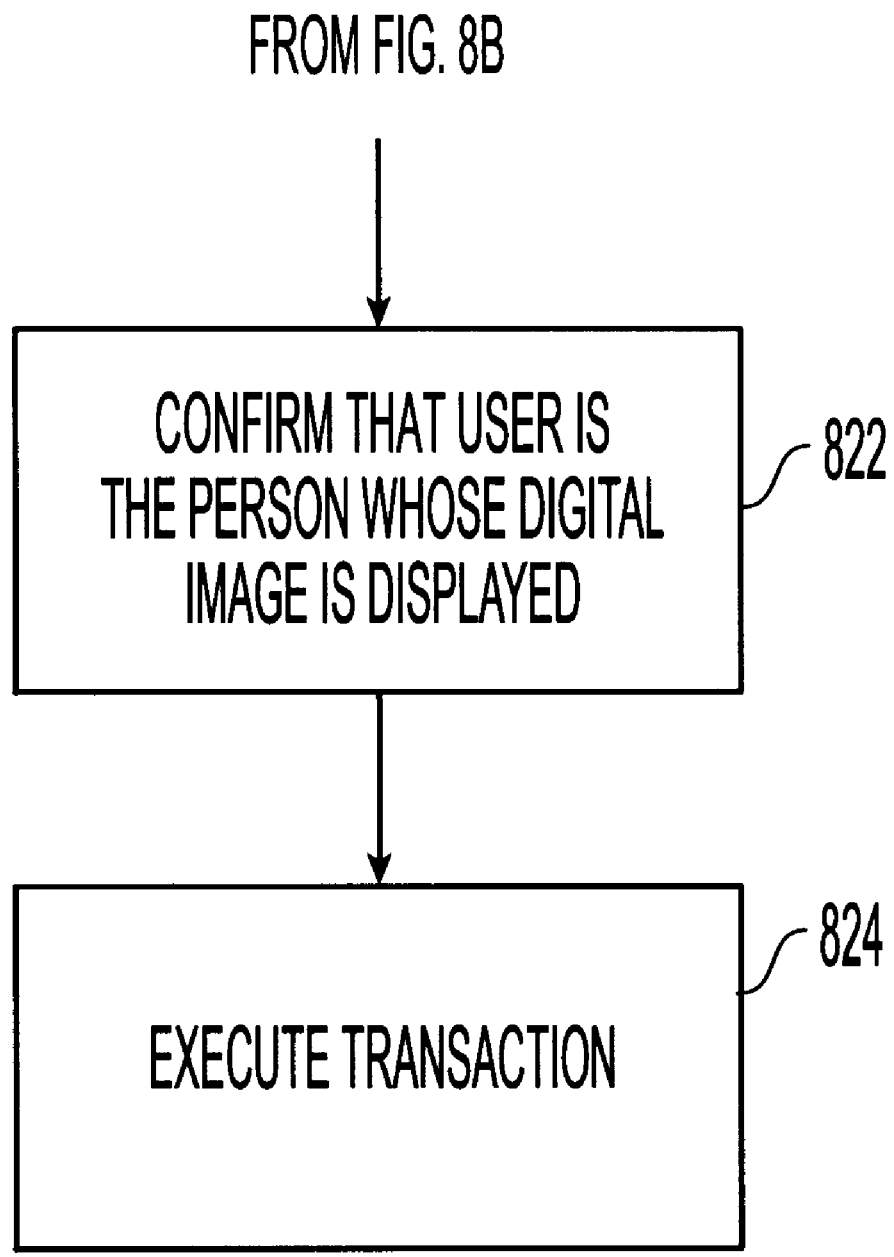

A further preferred application of the present invention is illustrated in FIGS. 7–8. As known in the art, it is desirable in many circumstances to demand photo-identification from an individual in order to confirm the individual's identity. For example, retailers often demand photo-identification from an individual presenting a smart-card credit card or other financial vehicle to confirm that he or she is the person named on the financial vehicle and is therefore authorized to use it, unless the financial vehicle itself has a picture of the customer printed on it. But users may be reluctant to have a picture of themselves printed on a credit card. Moreover, users may even be reluctant to have an electronic picture of themselves stored in the memory of a smart-card credit card since, for example, if the card is lost, the picture may be downloaded, displayed, reproduced, and disseminated without their control.

In a further preferred embodiment, this drawback is overcome by storing an electronic image of the user on the improved smart card of the present invention. The digital image may preferably be stored in memory 206 of smart card 100 at the time that smart card 100 is initialized, and may be updated at a later time if desired. Since access to the smart card is available only after CPU 204 matches the cardholder's stored fingerprint to the fingerprint of the authorized user, the user's image cannot be downloaded and viewed outside the user's presence. One preferred example of this aspect of the present invention is described in connection with FIG. 8.

As shown in FIG. 8A, in step 802, a store clerk scans one or more items to be purchased by passing the items over a scanner 705 (FIG. 7). Scanner 705 is preferably connected to a point-of-sale (POS) terminal 710 which may, for example, be located in a supermarket or other retail establishment. In step 804, the purchaser grasps smart card 100 between the purchaser's thumb and forefinger with the purchaser's thumb positioned over sensing surface 110 (FIG. 4A). In step 806, the purchaser inserts the card into a WRU 715 that is also connected to POS terminal 710 (FIG. 4B).

In step 808, WRU 715 transmits a reset signal to smart card 100 via contact C2. In step 810, smart card 100 confirms that the individual presenting the card is an authorized user by comparing the fingerprint of the finger located on sensing surface 110 to the stored fingerprint representation in memory 206, as described in detail above.

In step 812, smart card 100 transmits any information necessary for the transaction to POS terminal 710 via WRU 715. This information may, for example, include a payment message signed by the purchaser's private key and a copy of the purchaser's certificate. In step 814, POS terminal 710 confirms the purchaser's authority to pay for the goods by, for example, checking the signature on the payment message with the purchaser's public key and confirming the validity of the purchaser's certificate with an online certificate status request (e.g., OCSP request).

In step 816, smart card 100 transmits the stored digital image of the user to POS terminal 710 via WRU 715. In step 818, the digital image is displayed on a display 720 of POS terminal 710. In step 820, the store clerk compares the digital image to the face of the customer. In step 822, the store clerk confirms that the displayed digital image is that of the individual seeking to purchase the goods, typically by depressing a key on the keyboard 725 of POS terminal 710. In step 824, the transaction is executed.

In some circumstances, it may be desirable to permit two or more individuals to access information or services provided by a single smart card. For example, it may be desirable to permit either co-signer on a joint account to charge purchases to the account using a single smart card. Therefore, in a further preferred embodiment, memory 206 of smart card 100 may store fingerprint data for two or more authorized individuals. Fingerprint data for the two or more individuals may be stored during card initialization or, alternatively, fingerprint data for one or more of the authorized users of the smart card may be stored at a different time.

Figure 9:
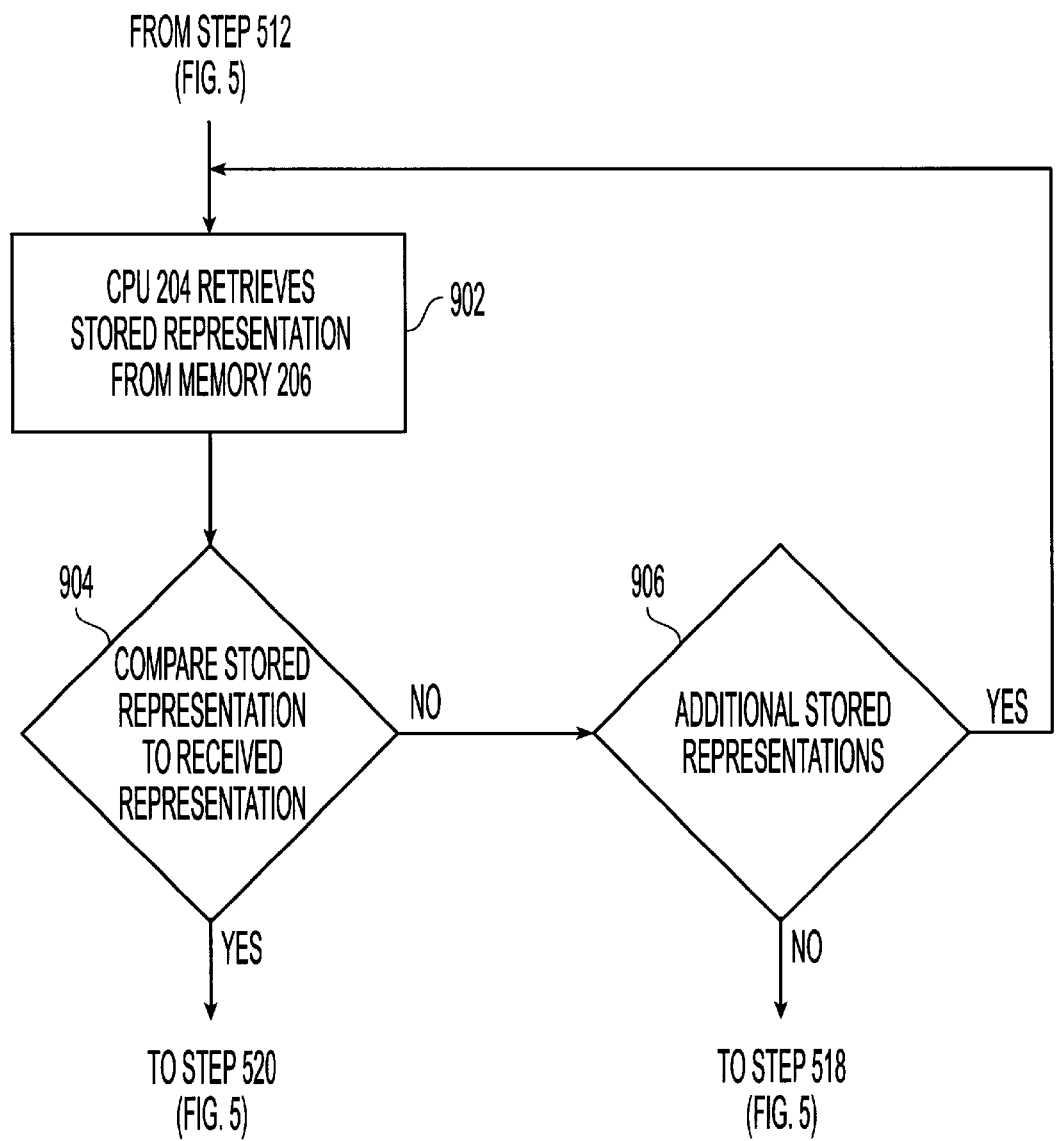
FIG. 9 is a flowchart depicting a further preferred embodiment of the present invention in which the smart card stores biometric information for two or more authorized individuals.

Use of smart card 100 in this preferred embodiment proceeds as described above in connection with FIG. 5, except that steps 514–516 of FIG. 5 are preferably replaced with the steps depicted in FIG. 9. In particular, as shown in FIG. 9, after fingerprint reader 208 transmits the acquired fingerprint representation of the user to CPU 204 (step 512), the system proceeds to step 902 where CPU 204 retrieves a stored fingerprint representation of a first authorized user from memory 206. In step 904, CPU 204 compares the retrieved fingerprint representation to the acquired fingerprint representation to determine whether the two representations match. If decision step 904 succeeds, i.e., the first stored fingerprint representation matches the received fingerprint representation, the system proceeds to step 520 in FIG. 5, and processing continues as described above.

Otherwise, if decision step 904 fails, i.e., the first stored fingerprint representation does not match the acquired fingerprint representation, then the system proceeds to step 906 where CPU 204 determines whether there are additional stored fingerprint representations of authorized users that have not yet been compared to the acquired fingerprint representation.

If decision step 906 fails, i.e., there are no additional authorized users, then the system proceeds to step 518, and processing continues as described above. Otherwise, if decision step 906 succeeds, i.e., the stored fingerprints of all authorized users have not yet been checked, then the system returns to step 902 to retrieve the stored fingerprint data for another authorized user from memory 206.

In a further preferred embodiment, where fingerprint data for two or more individuals is stored in memory 206 of smart card 100, CPU 204 may be programmed to provide each authorized individual access to a different set of information and/or services.

In some circumstances, it may be desirable to require the presence of two or more authorized individuals before access to information or services is provided by smart card 100. For example, it may be desirable to require two bank officers to be present in order for the bank's smart card to sign certain electronic documents. More generally, it may be desirable to require the presence of some number n of authorized individuals to enable smart card 100. The number n of authorized individuals whose presence is required may be some subset of a total number m of authorized individuals (i.e., authorization may require the presence of n out of m authorized individuals).

Therefore, in a further preferred embodiment, memory 206 of smart card 100 may store fingerprint data for m authorized individuals. Fingerprint data for the m individuals may be stored during card initialization or, alternatively, fingerprint data for one or more of the authorized users of the smart card may be stored at a different time.

Figure 10:
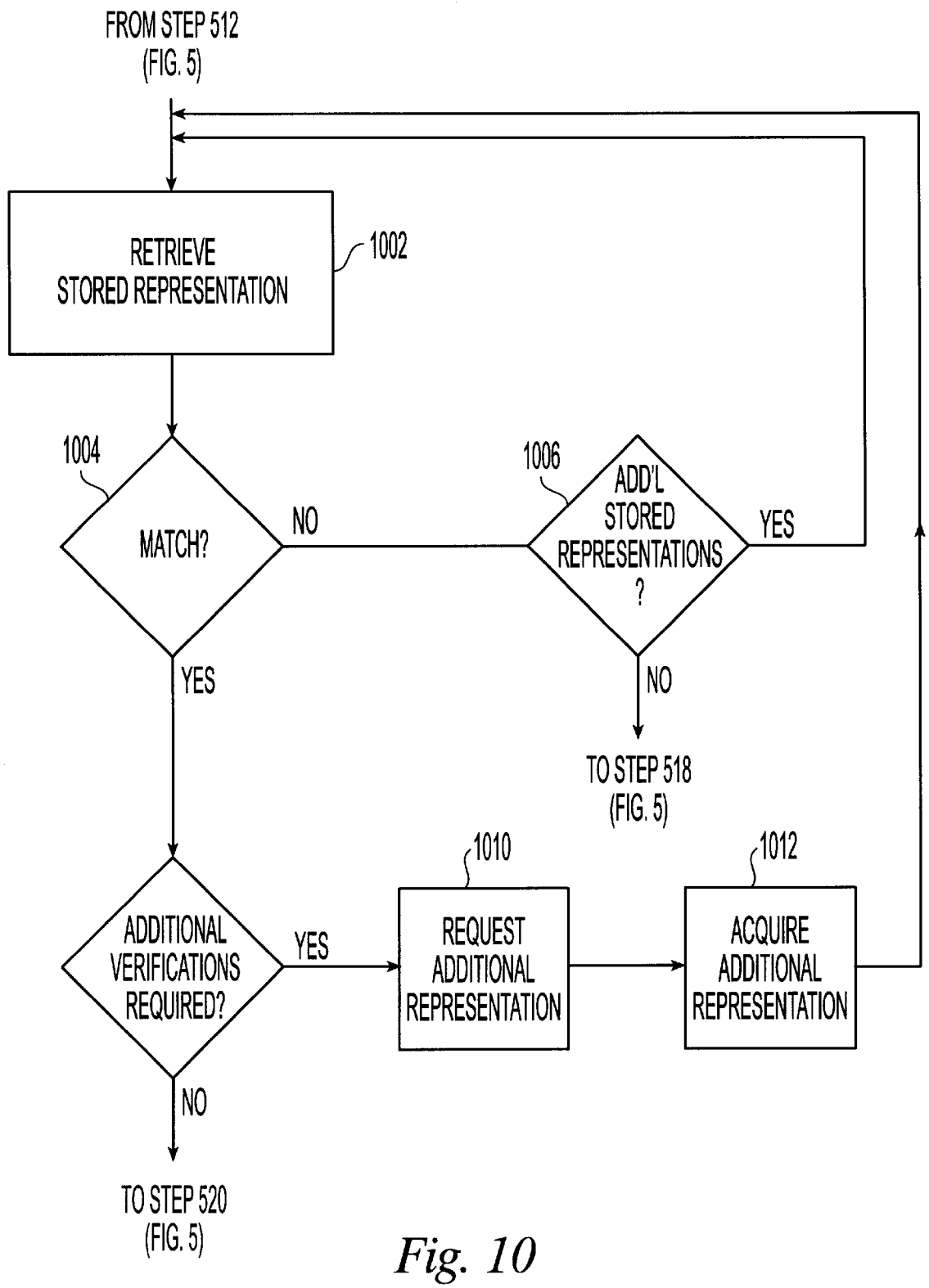
FIG. 10 is a further preferred embodiment of the present invention in which verification of the identity of n out of m individuals is required to enable the smart card.

Use of smart card 100 in this preferred embodiment proceeds as described above in connection with FIG. 5, except that steps 514–516 of FIG. 5 are preferably replaced with the steps depicted in FIG. 10. In particular, as shown in FIG. 10, after fingerprint reader 208 transmits the acquired fingerprint representation of the user to CPU 204 (step 512), the system proceeds to step 1002 where CPU 204 retrieves a stored fingerprint representation of a first authorized user from memory 206. In step 1004, CPU 204 compares the retrieved fingerprint representation to the acquired fingerprint representation to determine whether the two representations match.

If decision step 1004 fails, i.e., the first stored fingerprint representation does not match the acquired fingerprint representation, then the system proceeds to step 1006 where CPU 204 determines whether there are additional stored fingerprint representations of authorized users that have not yet been compared to the acquired fingerprint representation.

If decision step 1006 fails, i.e., there are no additional authorized users, then the system proceeds to step 518, and processing continues as described above. Otherwise, if decisions step 1006 succeeds, i.e., the stored fingerprints of all authorized users have not yet been checked, then the system returns to step 1002 to retrieve the stored fingerprint data for another authorized user from memory 206.

If decision step 1004 succeeds, i.e., the at least one of the stored fingerprint representations matches the received fingerprint representation, the system proceeds to step 1008, where the system determines whether additional verifications are required (i.e., whether fewer than n verifications have been performed). If step 1008 fails, the system proceeds to step 520 as described above in FIG. 5.

Otherwise, if step 1008 succeeds, the system proceeds to step 1010 where CPU 204 generates a signal to indicate that the first user should remove his or her finger from sensing surface 110 and that a different user should place his or her finger there. This signal may be transmitted to WRU 405 for display on display 415. Alternatively, smart card 100 may be adapted to generate a beep when the first user's identity has been verified and it is time for the second user to grasp the card. In step 1012, the second user grasps smart card 100 and smart card 100 acquires a fingerprint representation for this second individual. Processing then returns to step 1002, as described above.

In a further preferred embodiment, smart card 100 may be programmed to grant access to a first set of information and/or services to a first group $n_1$ of authorized individuals, and to grant access to a second set of information and/or services to a second group $n_2$ of authorized individuals.

In a further preferred embodiment, smart card 100 may be provided with a sensor to ensure that the finger placed on sensing surface 110 is attached to a living person. For example, smart card 100 may be provided with a temperature sensor to determine whether the temperature of the finger's surface is within an expected range.

Figure 11:
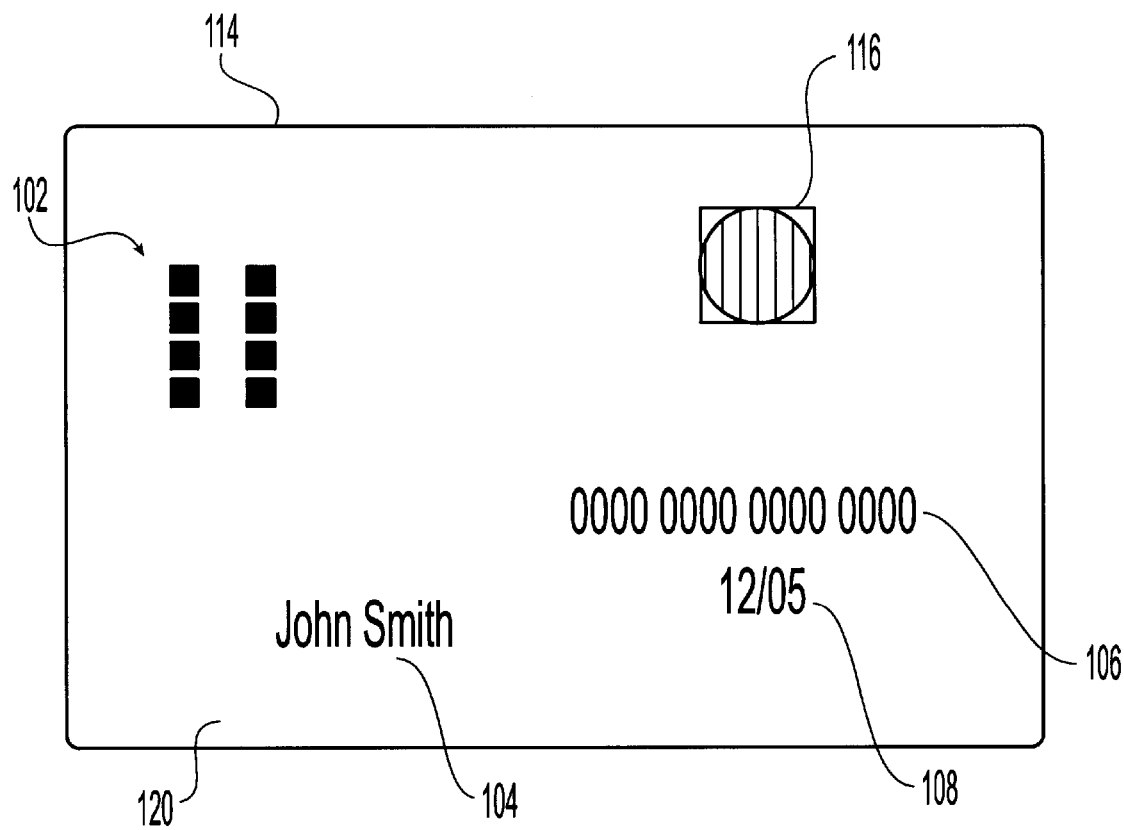
FIG. 11 is a further preferred embodiment of an improved smart card of the present invention in which the smart card comprises a microphone.
Figure 12:
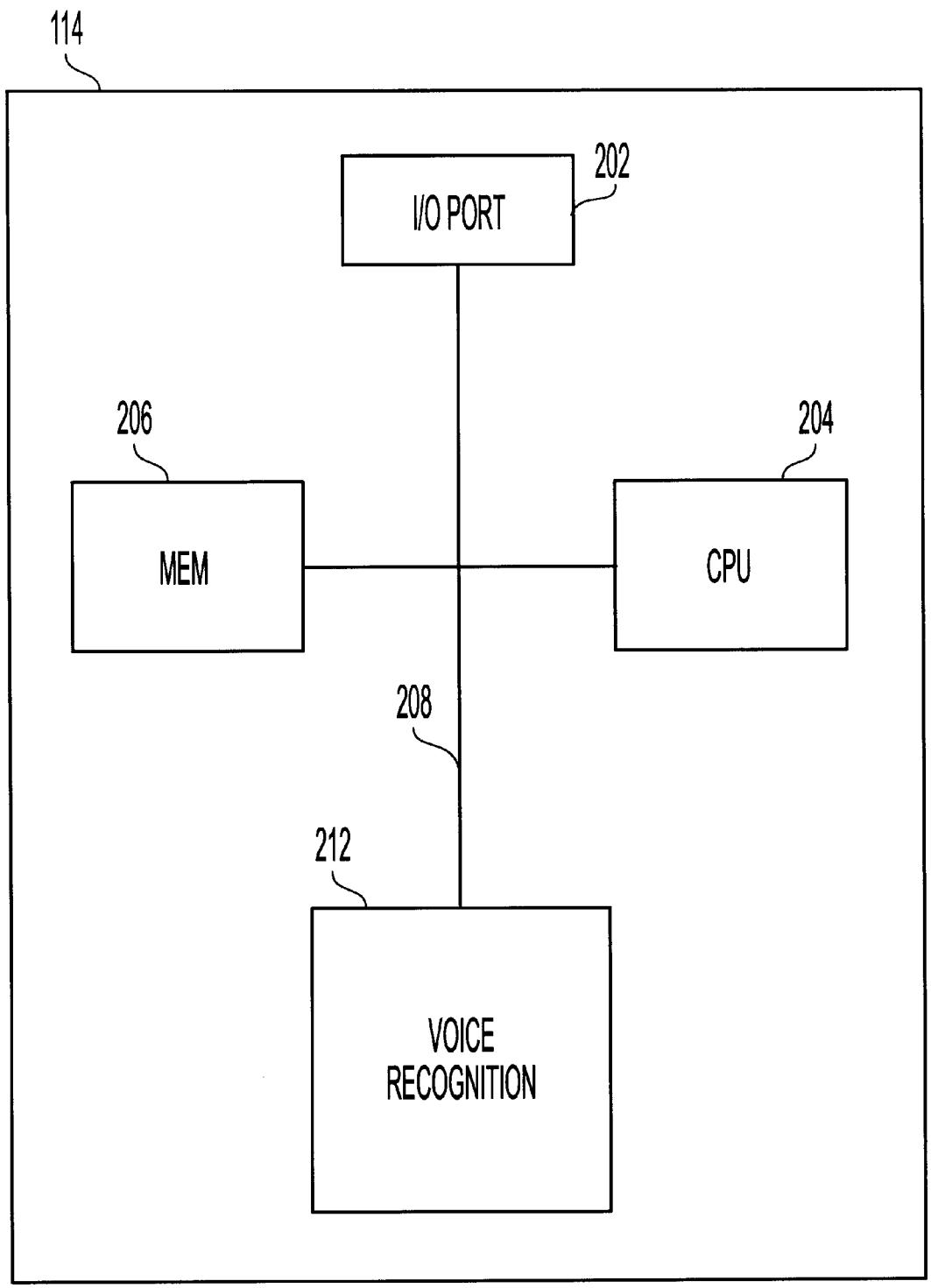
FIG. 12 is a schematic representation of the electronic components of the improved smart card of FIG. 10.

In further preferred embodiments, the principles of the invention may be extended to other biometrics, such as voice recognition. For example, as shown in FIGS. 11 and 12, in a further preferred embodiment, a smart card 114 may be provided with a microphone 116, and voice recognition hardware/software 212 for converting voice sounds received via microphone 116 into an electrical representation of a user's voice. In this preferred embodiment, initialization and use of smart card 114 proceeds as described above in connection with FIGS. 3, 5, and 9, except that the stored biometric representation used to identify the individual presenting the card is a stored voice characteristic of the individual, rather than a representation of the individual's fingerprint.

In a further preferred embodiment, the biometric may be retinal scan or face recognition. Moreover, for added security, an improved smart card comprising two biometric readers may be employed.

While the invention has been described in conjunction with specific embodiments, it is evident that numerous alternatives, modifications, and variations will be apparent to those skilled in the art in light of the forgoing description.

What is claimed is:

1. A smart card comprising:

a smart card housing having at least one surface, a sensing surface positioned in substantially the same plane as the surface of the housing;

a fingerprint processor for generating a representation of a fingerprint of a finger located on the sensing surface;

a memory containing a stored representation of a fingerprint;

a comparator located within the smart card housing for comparing the generated representation to the stored representation and adapted to output an indication of a result of the comparison between the generated representation and the stored representation;

a sensor for determining whether a finger placed on the sensing surface is attached to a living person;

wherein:

the indication is used to enable the smart card; and an image of the authorized individual is stored in the memory, and wherein access to the image is granted only if the card is enabled.

2. The smart card of claim 1, wherein the sensor comprises a temperature sensor.

3. The smart card of claim 1, wherein the smart card is adapted to be inserted into a write/read unit connected to a computer, and wherein access to programs or data on the computer is granted if the card is enabled.

4. The smart card of claim 3, wherein the computer is connected to at least one other electronic device, and wherein access to resources of the other electronic device is granted if the card is enabled.

5. The smart card of claim 1, wherein the generated and stored representations are representations of a thumbprint.

6. The smart card of claim 1, wherein the sensing surface is positioned such that a user's thumb is naturally positioned over the sensing surface as the user inserts the smart card into a smart card reader.

7. The smart card of claim 1, wherein the stared representation is collected during an initialization process.

8. The smart card of claim 7, wherein the smart card recognizes the first time that it is inserted into a write/read unit and transmits a signal to the write/read unit to trigger the initialization process.

9. The smart card of claim 7, wherein the smart card is programmed to permit only a single initialization process during the smart card's lifetime.

10. The smart card of claim 9, wherein the portion of the memory that stores the fingerprint representation is disabled so that it may not be written to again.

11. The smart card of claim 1, further comprising a plurality of electrical contacts.

12. The smart card of claim 11, wherein the electrical contacts are arranged in a manner that satisfies international smart card standard ISO 7816.

13. The smart card of claim 11, wherein the electrical contacts comprise end connectors.

14. A smart card comprising:

a smart card housing having at least one surface;

a sensing surface positioned in substantially the same plane as the surface of the housing;

a fingerprint processor for generating a representation of a fingerprint of a finger located on the sensing surface;

a memory containing a stored representation of a fingerprint;

a comparator located within the smart card housing for comparing the generated representation to the stored representation and adapted to output a first indication of the result of the comparison between the generated representation and the stored representation;

wherein:

the memory contains at least a second stored fingerprint representation;

the comparator is adapted to compare the generated representation to the second stored representation and to output a second indication of the result of the comparison between the generated representation and the second stored representation; and the first indication is used to enable a first set of resources that require the smart card and the second indication is used to enable a second set of resources that require the smart card.

* * * * *